United States Patent [19]

Brown, Jr. et al.

[11] Patent Number: 5,051,571
[45] Date of Patent: Sep. 24, 1991

[54] CASCADED ADAPTIVE OPTICS SYSTEM

[75] Inventors: Wilbur P. Brown, Jr., Bell Canyon; Thomas R. O'Meara; David M. Pepper, both of Malibu; Uzi Efron, Los Angeles; Bernard H. Soffer, Pacific Palisades, all of Calif.

[73] Assignee: Hughes Aircraft Company, Los Angeles, Calif.

[21] Appl. No.: 947,569

[22] Filed: Dec. 2, 1986

[51] Int. Cl.⁵ .......................... G01J 1/20; G02F 1/13
[52] U.S. Cl. ................... 250/201.9; 350/330; 455/609; 455/611
[58] Field of Search ............. 350/330; 250/201 R, 250/201.9; 455/609, 611, 618

[56] References Cited

U.S. PATENT DOCUMENTS 4,271,355  6/1981  Wisner et al. .............. 250/201
4,825,062  4/1989  Rather et al. .............. 250/201

OTHER PUBLICATIONS

A. D. Fisher et al., Optics Letters, Jul. 1983, vol. 8, No. 7, p. 353.
J. H. Shapiro et al., Optical Engineering, Jan–Feb. 1981, vol. 20, No. 1, p. 76.

*Primary Examiner*—Stephen C. Buczinski
*Attorney, Agent, or Firm*—V. D. Duraiswamy; W. K. Denson-Low

[57] ABSTRACT

A cascaded adaptive optics system for correction of aberrations in a light beam. The system includes a plurality of spatial light modulators (SLMs) in a cascaded arrangement to provide an adaptive optics system characterized by wide range, rapid response, and high resolution. The spatial light modulators may be identical or have characteristics that are complementary in providing a combined output that advantageously corrects for aberrations. A conventional adaptive optics system such as a deformable mirror may be used as one or more of the SLMKs. Liquid crystal light valves (LCLVs) may be advantageously used as one or more of the SLMs in the invention. A single LCLV may be cascaded with itself in a multiple-pass configuration by means of suitable reflectors.

24 Claims, 6 Drawing Sheets

CASCADED ADAPTIVE OPTICS SYSTEM

This invention was made with Government support under Contract No. F30602-83-C-0198 awarded by the Department of the Air Force. The Government ha certain rights in this invention.

BACKGROUND OF THE INVENTION

1. Field of the Invention

The present invention relates generally to optical systems, and more particularly to adaptive optics systems designed to compensate for phase aberrations in a light beam.

2. Description of the Related Art

An "adaptive optics" system is an optical system having components whose characteristics are controlled in real time, that is, during actual operation, to correct for wavefront aberrations. An important application for adaptive optics is the reduction of phase aberrations induced in a light beam by the atmosphere. For example, atmospheric turbulence can severely aberrate a laser beam being transmitted through the atmosphere to a target receiver or detector. An adaptive optics system can be used to compensate for such aberrations so that the beam is free of aberrations when it arrives at the receiving site. Deformable mirrors have been used to accomplish this compensation.

In a deformable mirror adaptive optics system, a reference beam reflected from a target propagates through the atmosphere to the deformable mirror. The reference beam is aberrated as it travels through the atmosphere. The aberrated reference beam is reflected by the mirror and a portion of the reflected beam is applied to a mirror control means such as a wavefront sensor. The wavefront sensor generates a set of optical wavefront error signals. These error signals are applied to a series of actuators to physically deform the deformable mirror to compensate for the aberrations in the reference beam.

More particularly, the mirror is deformed so as to induce in the received reference beam aberrations which are a conjugate, or in simplified terms an inverted replica, of the aberrations induced by the atmosphere. The effects of the atmospheric aberrations are canceled by the effects of these conjugate aberrations during the reflection process. Consequently, the reflected beam emerges from the mirror virtually aberration-free. Another class of adaptive optics mirror systems uses individually-addressed electro-optic phase shifters instead of deformable mirror mechanical actuators and has similar operational characteristics.

In some applications, after the mirror has been deformed in the manner described above, a second laser beam is directed toward the mirror. This second beam is reflected by the mirror and thence transmitted through the atmosphere toward the target. During this reflection process, the deformed mirror aberrates the second beam by inducing therein aberrations which are the conjugate of the aberrations that were induced in the reference beam by the atmosphere. As the second beam travels from the mirror to the target, it backtracks along the path of the reference beam and is aberrated by the same atmospheric turbulence that aberrated the reference beam. However, the second beam, having been pre-aberrated by the mirror, begins its journey carrying an aberration pattern which is the exact conjugate of the atmosphere-induced aberration pattern. Accordingly, as the second beam propagates through the atmosphere, the aberrations induced by the atmosphere cancel the aberrations induced by the mirror, and the beam arrives at the target substantially free of aberrations.

In other applications the 'reference' beam comprises a communications beam which carries information. The operation is essentially identical to that described above. After the aberrations in the communications beam are removed, the beam can be focused onto a coherent detector at the receiving site, with greatly improved efficiency and data handling capability due to the low phase distortion in the beam.

Atmospheric aberrations are often characterized by a relatively wide dynamic range measured in optical path differences. An adaptive optics system which uses a deformable mirror generally has a wide dynamic range and accordingly is well-suited to compensate for such aberrations. However, atmospheric aberrations may also be characterized by rapid spatial variations over a crosssection of the optical path encompassed by the laser beam, and the deformable mirror system does not have sufficiently fine resolution to compensate for such rapid spatial variations at all points. The reason for this is primarily mechanical since only a limited number of actuators can physically fit behind the mirror, and therefore the resolution of the deformable mirror system is correspondingly limited.

Some of these shortcomings of a deformable mirror system can be overcome by utilizing a liquid crystal light valve ("LCLV") system instead of a deformable mirror and the associated electro-mechanical control system. A typical LCLV for this application is a layered device comprising a mirror sandwiched between a liquid crystal layer and a photoconducting layer. This sandwich assembly is positioned between a pair of electrically-conductive elements. An electric potential applied across these elements generates an electric field that extends perpendicularly through the sandwich assembly. The conductivity of the photoconducting layer can be altered by projecting onto its back side a pattern of light of spatially-varying intensity. Such a change in conductivity spatially perturbs the electric field, and the perturbed electric field in turn causes the liquid crystal layer to induce, in a light beam propagating therethrough, a pattern of phase aberrations corresponding with the light intensity pattern being projected onto the back side of the photoconducting layer.

In an LCLV adaptive optics system, an aberrated reference beam from the target is directed through the liquid crystal layer toward the mirror and is reflected back through the liquid crystal layer by the mirror. After the reflected reference beam emerges from the liquid crystal layer, a portion of the beam is guided around to the other side of the LCLV toward the back side of the photoconducting layer. A local reference light beam, typically a monochromatic plane wave which may be provided by a local reference source, is combined with the reflected reference beam to create an interference pattern wherein the intensity variations are indicative of the phase aberrations in the reflected reference beam. This interference pattern is projected onto the photoconducting layer.

The photoconducting layer spatially perturbs the electric field according to the interference pattern, and the perturbed electric field in turn causes the liquid crystal layer to induce in the reference beam aberrations which are the conjugate of the aberrations induced in the beam by the atmosphere represented by the interference pattern. The effects of the atmosphere-induced aberrations are canceled by the effects of the conjugate aberrations and consequently the reflected reference beam emerges from the liquid crystal layer virtually free of aberrations.

A laser beam that is to be transmitted to the target is then projected toward the liquid crystal (LC) layer. This second beam passes through the LC layer into the LCLV and then is reflected by the mirror back out of the LCLV and thence toward the target. During this process, the LC layer induces in the second beam aberrations which are the same as the aberrations induced by the LC layer in the reference beam, and these aberrations are the conjugate of the aberrations that were originally induced in the reference beam by the atmosphere. Then, as the second beam travels through the atmosphere toward the target, aberrations are induced by the atmosphere. These atmospheric aberrations cancel the aberrations induced in the second beam by the LC layer, and the second beam arrives at the target virtually aberration-free.

Although the spatial resolution of the LCLV is much finer than that of the deformable mirror system, the LCLV has a much narrower dynamic range, and, like the deformable mirror system, it can only compensate for some classes of the aberrations induced by the atmosphere.

It will be apparent from the foregoing that in many instances neither a deformable mirror adaptive optics system nor an LCLV adaptive optics system can fully compensate for atmosphere-induced aberrations in a laser beam. Accordingly, there is a need for an adaptive optics system having both the large dynamic range characteristic of a deformable mirror system and the fine resolution characteristic of an LCLV system.

SUMMARY OF THE INVENTION

An adaptive optics system according to the present invention employs a spatial phase modulator such as a liquid crystal light valve ("LCLV") in a cascaded configuration, the resultant capabilities being characterized by fine resolution, rapid response time, and wide dynamic range compared to previous adaptive optics systems. The system may comprise a single device, a plurality of identical or similar devices, or a set of complementary devices depending on the preferred configuration, application requirements, and particular desired combination of parameters.

A preferred embodiment of the present invention comprises a cascaded LCLV adaptive optics system having a plurality of LCLVs. For convenience and as an example of a preferred embodiment of the invention developed by the inventors, a system comprising a first and second LCLV is described. The first LCLV receives an aberrated reference light beam and provides a first reflected beam in response. A first error detection means provides, as an input to the first LCLV, a first error signal indicative of the aberrations in the first reflected beam. The response of the first LCLV compensates for the aberrations in the reference beam by inducing aberrations in the first reflected beam which are an inverted replica of the aberrations in the reference beam.

The second LCLV receives the first reflected beam and provides a second reflected beam in response. Second error means provides as an input to the second LCLV, a second error signal indicative of any aberrations in the second reflected beam, and in response the second LCLV compensates for the aberrations in the first reflected beam by inducing aberrations in the second reflected beam which are an inverted replica of the aberrations in the first reflected beam.

The two LCLVs may be configured to provide characteristics that are complementary to the invention, i e., they may each address a portion of the error compensation problem. Cascading two complementary LCLVs according to the invention provides an adaptive optics system having the best characteristics of both, while minimizing their deficiencies. For example, one LCLV may include a cadmium sulfide photoconductor, and therefore have a wide dynamic range, while the other LCLV may include a silicon photoconductor which is characterized by a more rapid response time than the cadmium sulfide photoconductor. An adaptive optics system comprising one of each of such LCLVs in 'cascade' provides a system characterized both by wide dynamic range and rapid response time.

One of the error signals may comprise an interference pattern between a portion of one of the reflected beams and a local reference beam. The error means includes means for generating the local beam and means for generating the interference pattern. The interference pattern may be generated, for example, by a system of mirrors which combines the two beams and images them onto the input of the LCLV. The means for generating the local beam may include a spatial filter. A portion of one of the reflected beams is applied to the filter, and the filter derives the local beam from the reflected beam.

A laser source can be used to project a laser beam toward the second LCLV along a path followed by the second reflected beam. The laser beam propagates in a direction opposite to the second reflected beam and is reflected in turn by the second LCLV and the first LCLV. It then exits the system. The LCLVs induce in the laser beam reflected in this manner aberrations that are a conjugate of the aberrations present in the reference beam.

In an alternate embodiment, the error signal for the first LCLV, as well as the error signal for the second LCLV, is derived from the second reflected beam, a configuration that provides faster response than does the previously discussed embodiment, but that is not as effective in compensating for the very low, temporal frequency aberrations in the reference beam.

In another variation, only a single LCLV is used. Reflector means, such as a plurality of mirrors, reflects a portion of the first reflected beam back through the liquid crystal layer for a second pass to provide the second reflected beam. More than two such passes can be made by using a plurality of mirrors or other optical devices arranged to define a multiple-pass optical path.

A LCLV may be cascaded with an adaptive optical compensation means such as a deformable mirror system to form a hybrid adaptive optics system. The optical compensation means receives the aberrated reference beam, effects partial compensation for the aberrations in the beam, and provides a first reflected beam to the LCLV, which then compensates for any residual aberration, as described above.

In the hybrid cascaded system, as in the cascaded systems previously described, the overall system characteristics are optimized according to the characteristics of the cascaded devices. For example, a hybrid system using a silicon LCLV and a deformable mirror is characterized by the large dynamic range correction of low-spatial-frequency errors provided by the deformable mirror and by the smaller range correction of high-spatial frequency aberrations provided by the LCLV.

It will be appreciated from the foregoing that the present invention represents a significant advance in the field of adaptive optics in that a cascaded adaptive optics system according to the invention provides a system that is not limited by the limiting characteristics of any one device but rather is characterized by the optimum utilization of the characteristics of the cascaded devices.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

As shown in the exemplary drawings, the present invention is embodied in a cascaded adaptive optics system exploring spatial light modulators. Conventional adaptive optics systems are characterized by wide dynamic range but limited spatial resolution; LCLV adaptive optics systems provide high spatial resolution but have a relatively limited dynamic range. A cascaded system according to the invention provides at one SLM in cascade with at least one other SLM of different characteristics from the first SLM to provide an adaptive optics system having many of the best characteristics of both devices while minimizing their deficiencies. While a cascaded adaptive optics system according to the present invention can incorporate a variety of SLMs, such a system incorporating LCLVs has many beneficial characteristics for various aberration correction tasks. The preferred embodiment described below describes the invention in the context of such a cascaded adaptive optics system incorporating two LCLVs, although it can be seen that a variety of SLMs and numbers of stages of cascaded devices may be advantageously used, depending on the application and the SLMs available.

Figure 1:
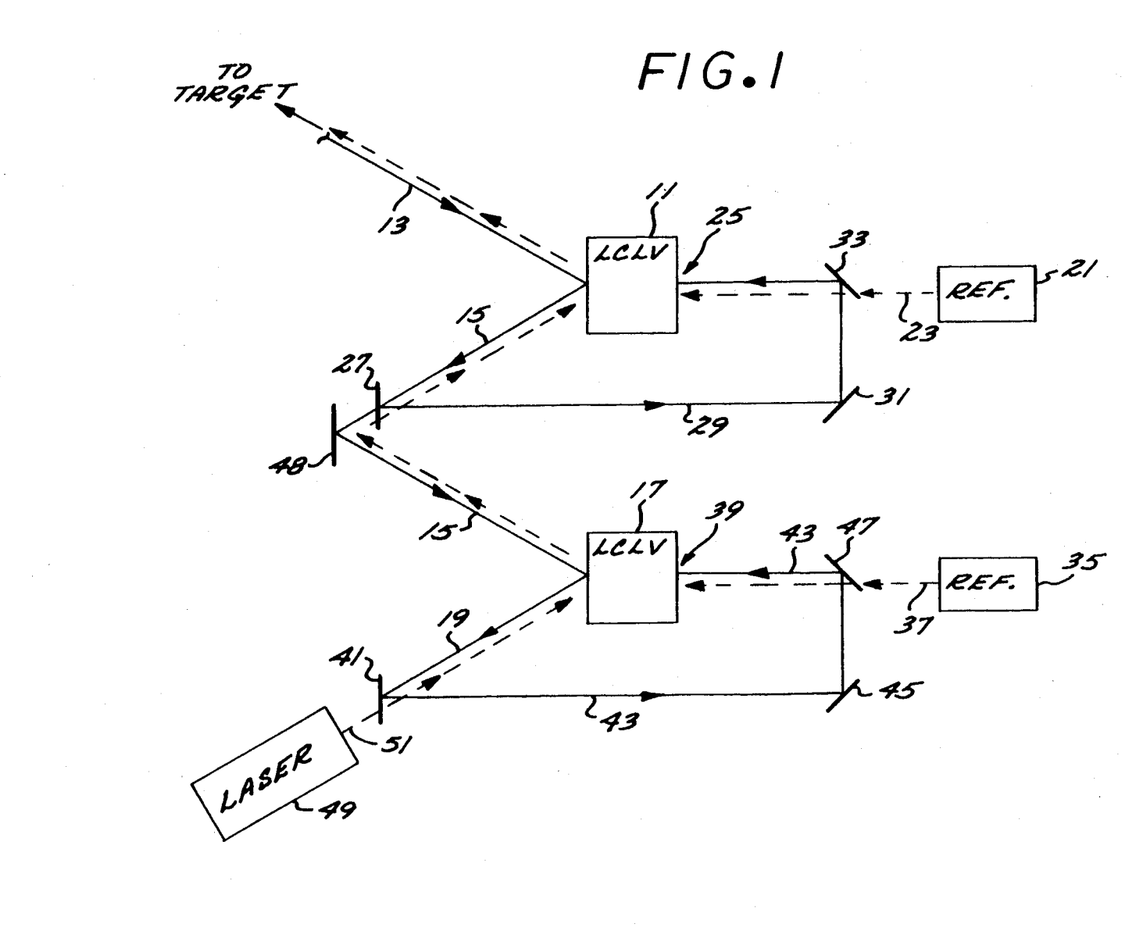
FIG. 1 is a schematic diagram of a cascaded adaptive optics system employing two liquid crystal light valves according to the present invention.

Referring to FIG. 1 of the exemplary drawings, a cascaded LCLV adaptive optics system according to the present invention includes a first LCLV 11 disposed to receive an aberrated reference light beam 13 and operative to provide a first reflected beam 15 in response thereto, and a second LCLV 17 disposed to receive the first reflected beam 15 and operative to provide a second reflected beam 19 in response thereto.

It will be understood by those who are skilled in the art that these systems require accurate registration between the front side optical field phase variations and the corresponding backside amplitude variations which correspond to them and in this respect, these exemplary diagrams are conceptual and the components necessary to achieve this registration are not shown in the drawings. Techniques and components for achieving this registration are discussed in pending patent application Ser. Nos. 865,231 titled "Integrated Adaptive Optics Apparatus" and 865,224 titled "Method for Improving the Spatial Resolution In An Integrated Adaptive Optics Apparatus", both of which are assigned to the assignee of this application.

The LCLV 11 compensates for the aberrations in the reference beam 13 and the LCLV 17 compensates for any residual aberration in the first reflected beam 15. The LCLV 11 and the LCLV 17 may have complementary speed and dynamic range characteristics, thereby providing a system which offers both a wide dynamic range and a rapid response time, or they may be identical so as to optimize one or more selected system characteristics. A cascaded LCLV adaptive optics system offers enhanced performance, and can be tailored to meet the requirements of any of a variety of specific applications.

First error means comprising means 21 for generating a local reference beam 23, is operative to provide, at an error input 25 of the first LCLV 11, a first error signal, for example, comprising an interference pattern between the local beam 23 and the first reflected beam 15. The first error signal is indicative of any aberrations in the first reflected beam 15. The first LCLV 11 is responsive to the first error signal and compensates for the aberrations in the reference beam 13 by inducing aberrations in the first reflected beam 15 which are an inverted replica of the aberrations in the reference beam 13.

More particularly, a beam splitter 27 is disposed to intercept the first reflected beam 15 and to reflect a portion 29 thereof to a reflector 31 which in turn reflects the beam to a partial reflector 33. The partial reflector 33 reflects the beam portion 29 toward the input 25 of the LCLV 11. The local beam 23 passes through the partial reflector 33 toward the input 25 of the LCLV 11. The beam 23 and the beam portion 29 interfere and produce an interference pattern which comprises the first error signal applied at the input 25.

Similarly, second error means, for example comprising means 35 for generating a local reference beam 37, is operative to provide, at an error input 39 of the second LCLV 17, a second error signal, for example comprising an interference pattern between the local beam 37 and the second reflected beam 19. The second error signal is indicative of any aberrations in the second reflected beam 19. The second LCLV 17 in response to the second error signal, compensates for any residual aberration in the first reflected beam 15 by inducing aberrations in the second reflected beam 19 which are an inverted replica of the aberrations in the first reflected beam 15.

More particularly, a beam splitter 41 is disposed to intercept the second reflected beam 19 and to reflect a portion 43 thereof to a reflector 45 and thence to a partial reflector 47. The partial reflector 47 reflects a beam portion 43 toward the input 39 of the LCLV 17. The local beam 37 passes through the partial reflector 47 towards the input 39 of the LCLV 17. As the beam 37 and the beam portion 43 arrive at the input 39, they interfere producing an interference pattern which comprises the second error signal.

A reflector 48 reflects the first reflected beam 15 from the first LCLV 11 to the second LCLV 17. The first LCLV 11 and the second LCLV 17 may have complementary speed and dynamic range characteristics. One of them may include a cadmium sulfide photoconductor or a silicon photoconductor, and if one includes a silicon photoconductor, then the other may include a cadmium sulfide photoconductor to provide a complementary system.

A laser source 49 projects a laser beam indicated by a dashed line 51 toward the second LCLV 17 along a path followed by the second reflected beam 19. After passing through the beam splitters 51, the laser beam 53 travels in a direction opposite to reflected beam 19. The laser beam 53 is reflected in turn by the second LCLV 17 and then the first LCLV 11. The laser beam 53 travels from LCLV 11 in a direction opposite to the reference beam 13, the LCLVs 17 and 11 being operative to induce in the laser beam 53 when thus reflected, aberration that is a conjugate of the aberration present in the reference beam 13.

Figure 2:
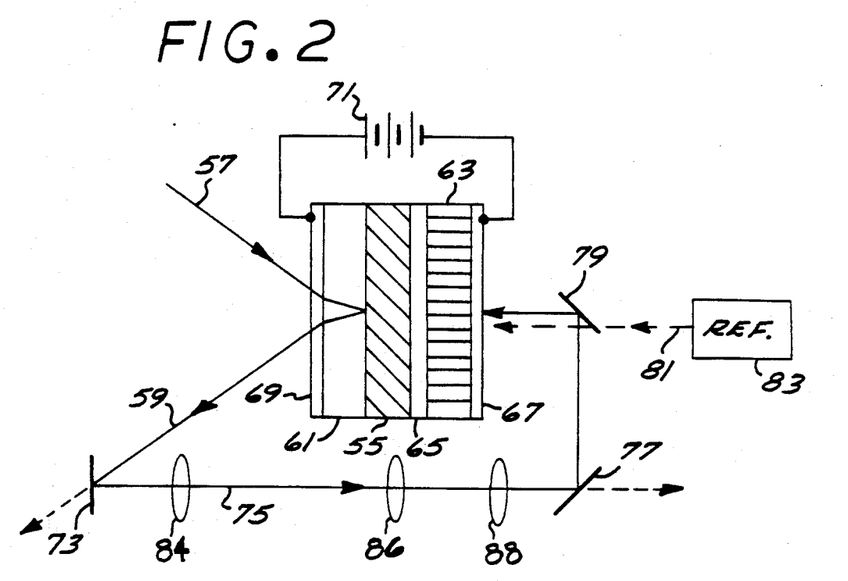
FIG. 2 is a schematic diagram of one of the LCLVs of FIG. 1.

Referring to FIG. 2, illustrated is a liquid crystal light valve such as the LCLV 11 or the LCLV 17 comprises a dielectric mirror 55 for receiving an aberrated light beam 57 and providing in response thereto a reflected beam 59. A mirror 55 is sandwiched between a liquid crystal layer 61, through which the beams 57 and 59 must propagate en route to and from the mirror 55, and a photoconductor layer 63. A thin opaque layer 65 separates the photoconductor layer 63 from the mirror 55, and the entire LCLV is sandwiched between a pair of transparent electrodes 67 and 69. A voltage source such as a battery 71 is connected to the electrodes 67 and 69 to establish an electric field therebetween.

A beam splitter 73 intercepts the reflected light beam 59 and reflects a portion 75 of the beam 59 through lenses 84, 86 and 88 to a beam splitter 77 and thence to a partial reflector 79. A local reference beam 81 from a reference generator 83 passes through the partial reflector 79 to the photoconductor layer 63. The beam portion 75 is reflected by the partial reflector 79 to the photoconductor layer 63 where it forms an interference pattern with the local beam 81. The interference pattern is indicative of any aberration in the reflected beam 59.

The conductivity of the photoconductor 63 changes in accordance with the interference pattern, and this change in turn perturbs the electric field between the electrodes 67 and 69. The liquid crystal layer 61 aberrates the beams 57 and 59 as they propagate therethrough according to the perturbed electric field such that the aberration induced by the liquid crystal layer 61 is a conjugate of the aberration in the beam 57, thereby tending to eliminate any aberration in the reflected beam 59.

In the case of distortions and/or spatial light modulators which contain high spatial frequency components, diffractive effects may cause the feedback beam 75 to address pixel on the photoconductor side of the LCLV. In such cases, a unity magnification, non-inverting optical imaging system is required to faithfully reproduce the field distribution of the beam that is initially incident on the LC layer 61 to the photoconductor side 63 of the LCLV. An example of such an imaging system is depicted by lenses 84, 86 and 88 in FIG. 2 and is also discussed in pending patent application Ser. No. 865,224 assigned to the assignee of the present invention.

The local reference beam 81 must be coherent with the reflected beam 59 in order that the interference pattern therebetween be indicative of any aberration in the beam 59. Such a coherent reference beam can be provided, for example, by a reference generator 83.

Figure 3:
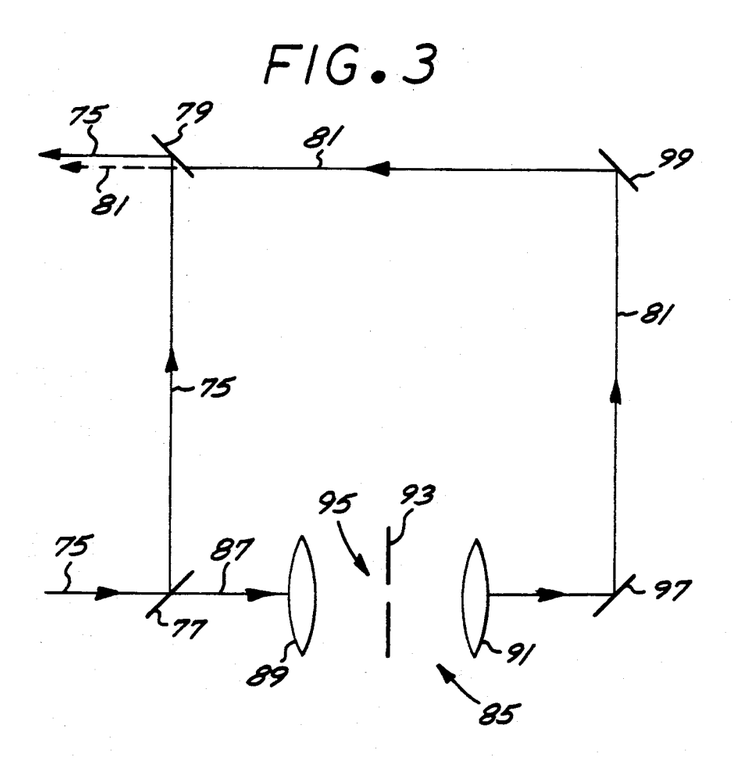
FIG. 3 is a schematic diagram of a spatial filter means for providing the local reference beam of FIG. 1.

Referring to FIG. 3, another filtering means to provide the comparative function described above comprises a spatial filter 85 disposed to receive through the beam splitter 77 a portion 87 of the portion 75 of the reflected beam 59 and operative to derive therefrom the local beam 81. The filter 85 comprises a focusing lens 89 to receive the portion 87 of the beam 59, a collimating lens 91 to provide the local beam 81, and an aperture plate 93 defining an aperture 95 and disposed between the lenses 89 and 91. Reflectors 97 and 99 receive the local beam 81 from the collimating lens 91 and guide the beam 81 through the partial reflector 79.

Figure 4:
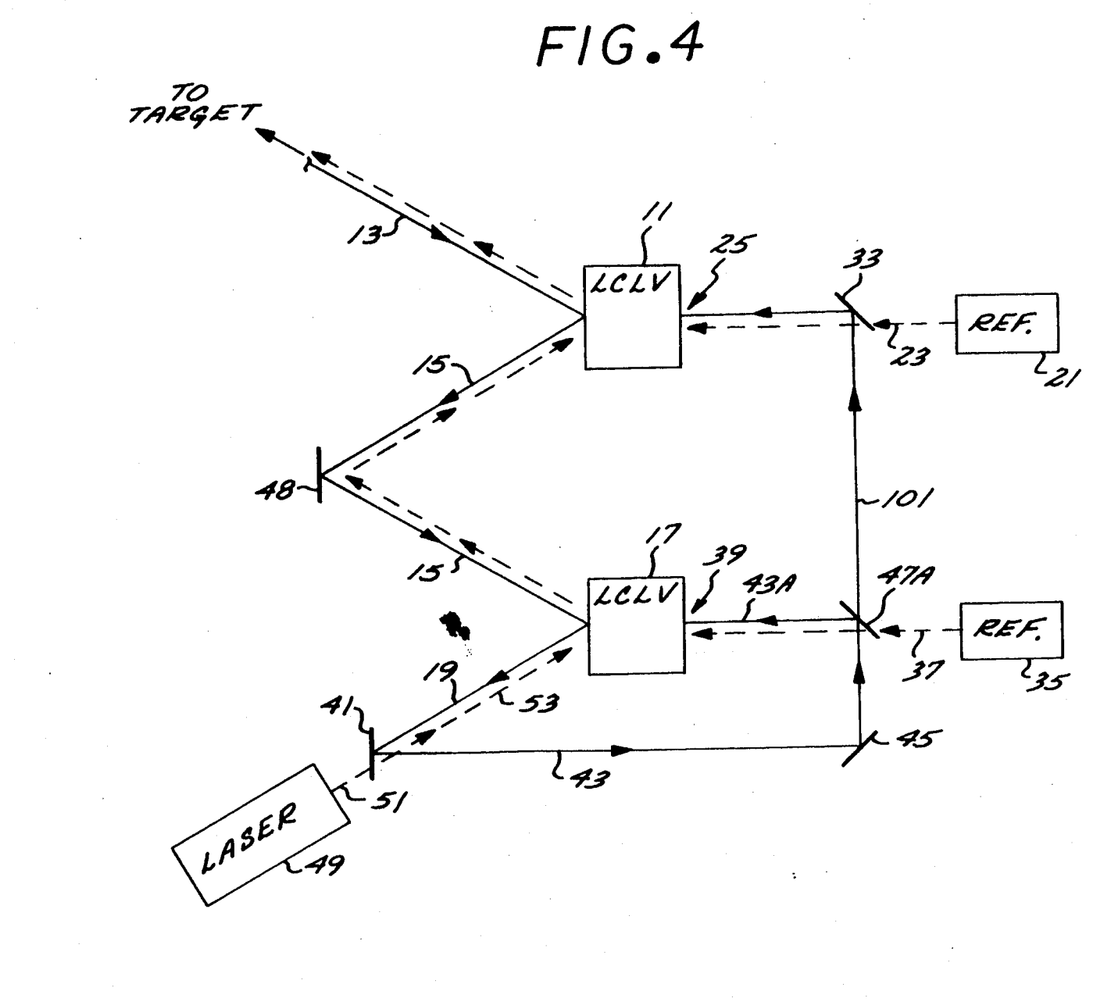
FIG. 4 is a schematic diagram of a cascaded adaptive optics system similar to that shown in FIG. 1 but deriving error beams for both LCLVs from a single reflected beam.

FIG. 4 illustrates an alternate embodiment of the invention. This embodiment is similar to that shown in FIG. 1, and for convenience, components in FIG. 4 that are similar to components in FIG. 1 are assigned the same reference numerals; analogous but changed components are assigned the same reference numerals accompanied by the letter "A", and different components are assigned different reference numerals.

The embodiment shown in FIG. 4, like that shown in FIG. 1, comprises a pair of LCLVs 11 and 17. The difference between the two embodiments is that the first reflected beam 15 is not used to generate the first error signal for application to the input 25 of the first LCLV 11. Instead, a portion 101 of the portion 43 of the second reflected beam 19 propagates through a partial reflector 47A toward the partial reflector 33 and thence toward the input 25 of the first valve 11, and another portion 43A of the beam portion 43 is reflected by the partial reflector 47A toward the input 39 of the second LCLV 17.

Thus, whereas in the embodiment of FIG. 1 the first error signal is derived from the first reflected beam 15 and the second error signal is derived from the second reflected beam 19, in the embodiment of FIG. 4, both error signals are derived from the second reflected beam 19. The embodiment of FIG. 4 is characterized by a faster response time and generally performs better for atmospheric turbulence compensation but also generally provides a somewhat lower residual error for nearly static aberration compensation than the embodiment of FIG. 1.

Figure 5:
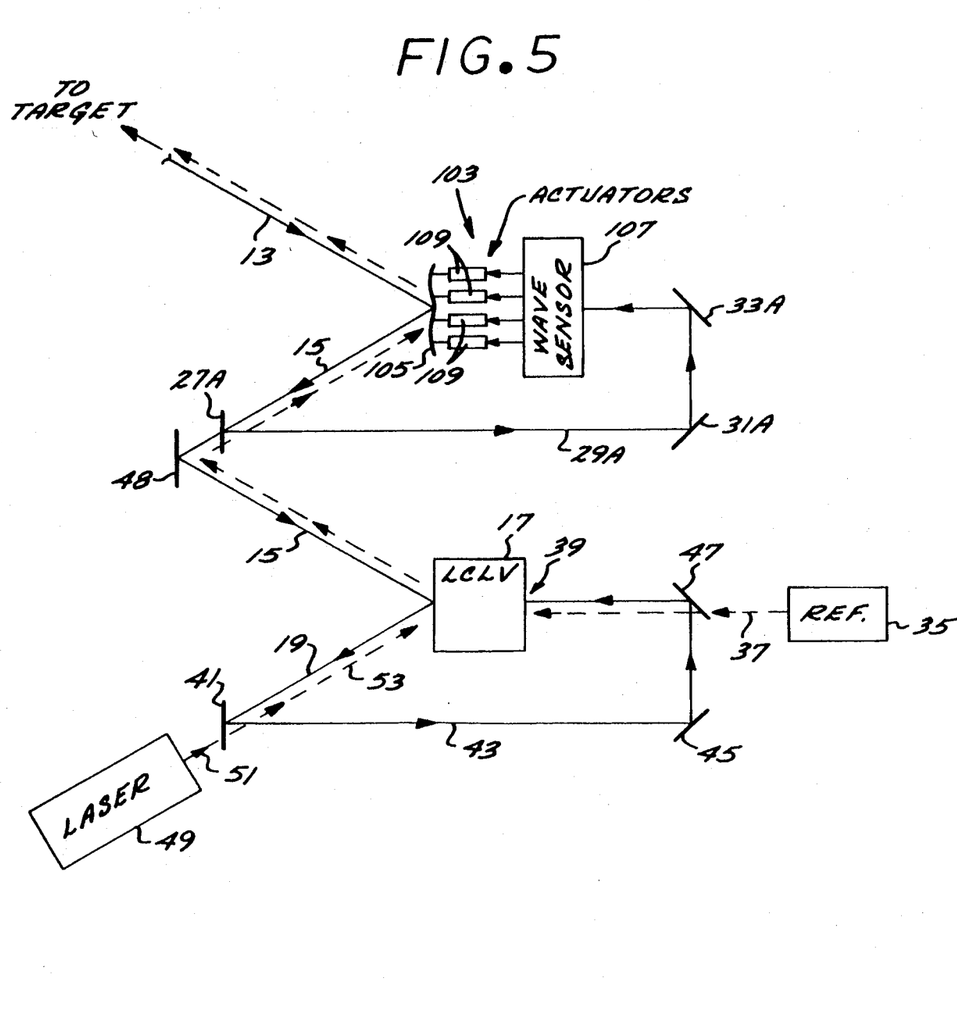
FIG. 5 is a schematic diagram of a hybrid cascaded adaptive optics system similar to that shown in FIG. 1 but employing a deformable mirror in place of one of the LCLVs.

A hybrid cascaded LCLV adaptive optics system according to the invention is shown in FIG. 5. This embodiment is also similar to that shown in FIG. 1 and for convenience, components in FIG. 5 that are similar to components in FIG. 1 are assigned the same reference numerals; analogous but changed components are assigned the same reference numerals accompanied by the letter "A", and different components are assigned different reference numerals.

In the hybrid system, an adaptive optical compensation means designated generally as 103 is disposed in place of the LCLV 11 to receive the aberrated reference light beam 13. The compensation means 103 is operative to provide the first reflected beam 15 in response to the reference beam 13.

More particularly, the compensation means 103 comprises a deformable mirror 105, disposed to receive the aberration reference light beam 13 and operative to provide the first reflected beam 15 in response thereto; means such as a beam splitter 27A for providing a mirror correction beam 29A from the first reflected beam 15; mirror control means such as a wave front sensor 107, disposed to receive the mirror correction beam 29A and operative to provide a deformation signal indicative of any aberration therein; and mirror deforming means such as a plurality of actuators 109, responsive to the deformation signal to compensate for the aberration in the reference beam 13 by deforming the mirror 105 to induce in the first reflected beam 15 aberration that is a conjugate of the aberration in the reference beam 13.

A hybrid system combines the wide range typical of a deformable mirror adaptive optics system with the high resolution and rapid response time characteristic of an LCLV system to provide a highly versatile combination. Such a system can be fabricated by adding an LCLV adaptive optics system to an existing deformable mirror system to improve the performance of the existing system by extending its dynamic range and its spatial frequency compensation capability.

Figure 6:
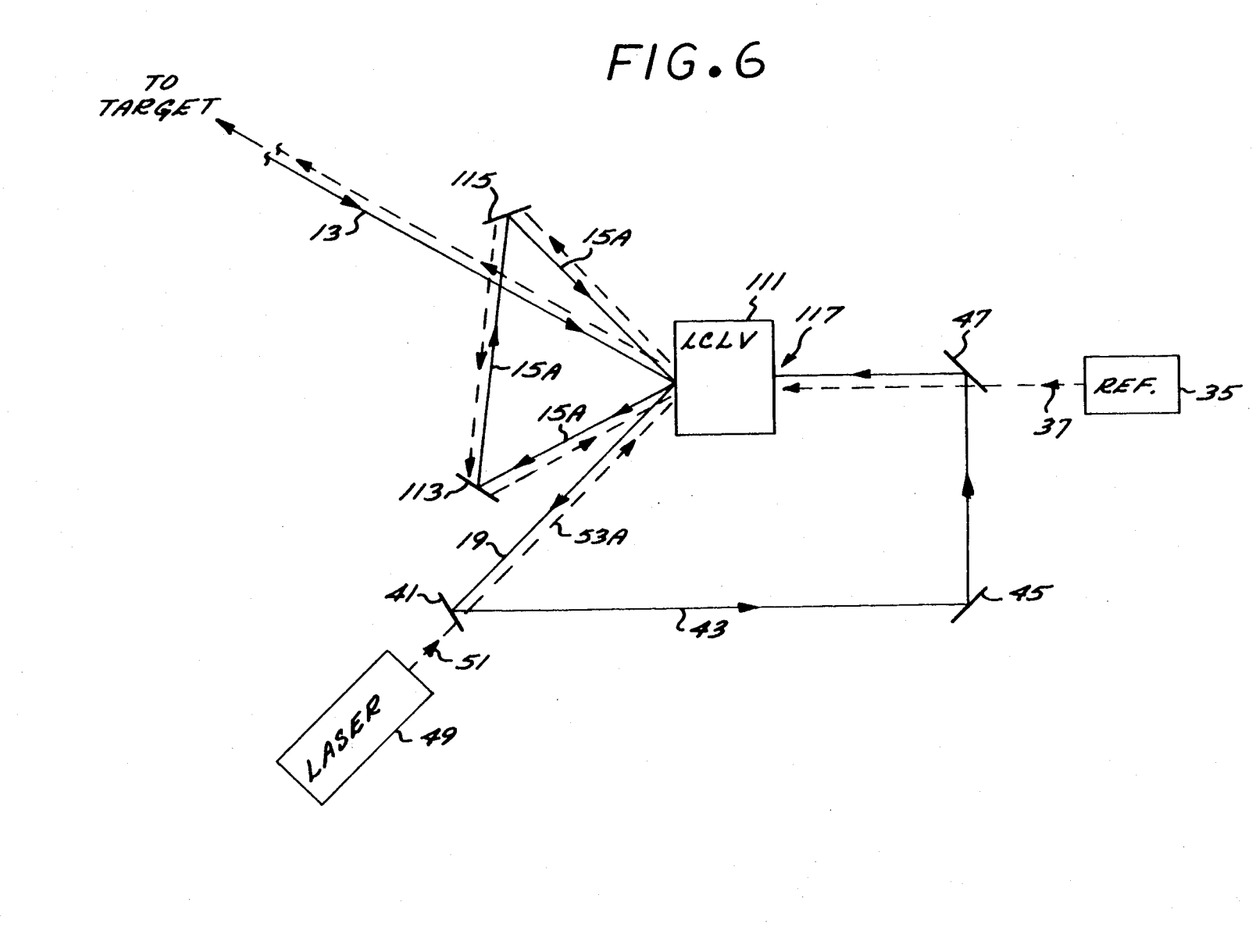
FIG. 6 is a schematic diagram of an alternate embodiment of a cascaded adaptive optics system employing a single LCLV and reflection means to provide more than one pass through the valve.

FIG. 6 illustrates a multiple-pass cascaded liquid crystal light valve adaptive optics system according to the invention. This embodiment is functionally similar to that shown in FIG. 4, and for convenience components in FIG. 6 that are similar to components in FIG. 4 are assigned the same reference numerals; analogous but changed components are assigned the same reference numerals accompanied by the letter "A", and different components are assigned different reference numerals.

The multiple-pass system differs from the embodiment shown in FIG. 4 in that a aberrated reference beam 13 makes multiple passes through a single LCLV 111 rather than making a single pass through each of a plurality of LCLVs 11 and 17. In particular, the LCLV 111 is disposed to receive the distorted reference beam 13 and to provide a first reflected beam 15A in response thereto. Reflector means, comprising for example a first mirror 113 and a second mirror 115, is operative to reflect the first reflected beam 15A back into the LCLV 111, the LCLV 111 being operative in response thereto to provide the second reflected beam 19. As in the embodiment of FIG. 4, a portion 43 of the second reflected beam 19 is used to derive the error signal for application to an input 117 of the LCLV 111. In response to the error signal, the LCLV 111 induces in the reflected beams 15A and 19 aberration that is a conjugate of the distortion in the reference beam.

The laser source 49 projects the laser beam 51 toward the LCLV 111 along a path followed by the second reflected beam 19, the laser beam 51 propagating oppositely thereto whereby the laser beam is reflected in turn by the LCLV 111, the mirrors 115 and 113, and the LCLV 111 again, the laser beam 51 thence propagating oppositely to the reference beam 13 toward the target, the LCLV 111 being operative to induce in the laser beam 51 when thus reflected, aberration that is a conjugate of the aberration present in the reference beam 13.

A cascaded LCLV adaptive optics system according to the present invention provides an adaptive optics system characterized by wide range, rapid response, and high resolution. Two identical LCLVs may be cascaded to optimize any of these parameters, or a pair of complementary devices may be used to provide a system having an optimum combination of parameters, or an LCLV may be cascaded with a conventional adaptive optics system such as a deformable mirror to improve the performance thereof. An adaptive optics system according to the present invention can perform tasks that other systems cannot perform as well or cannot perform at all, and hence represents a significant advance in the field of adaptive optics.

Efficient operation of the cascaded LCLV adaptive optics system described above in the preferred embodiment requires that the LCLVs meet certain performance requirements. These requirements are discussed in detail in pending patent application Ser. No. 865,231, assigned to the assignee of the present invention, and are herein incorporated by reference and briefly summarized below. The phase as well as the frequency of the local reference beam must be maintained in a fixed relationship relative to the aberrated reference and reflected beams. Additionally, the optical relay system, made up of those components which transfer the reflected aberrated beams to the error inputs of the LCLVs where they are combined with local references to generate interference patterns, must fulfill certain critical requirements to function. In order to maximize the sensitivity of the invention to small phase errors in the aberrated reference, the phase of the local reference should be offset by $\pi/2$ radians from the mean phase of the aberrated reference beams reflected by the cascaded LCLVs.

With these $\pm\pi/2$ shifts, the system has maximum sensitivity to small relative phase shifts between the remote reference and local reference beams, and hence optimum signal-to-noise performance.

The relative phase between the local and aberrated reference beams must be set and their frequency difference must be minimized using phase-locked loop or other appropriate techniques. Another requirement for efficient operation is relay fidelity commensurate with the basic spatial compensation capability of the system. As a further requirement, the beams incident upon the error input or photoconductor side of the LCLVs should be in exact spatial registration with the aberrated reference beams incident on the other side of the LCLVs. For example, the beam resulting from interference between local beam 23 and first reflected beam 15 must have the same angle of incidence with respect to the photoconductor as the aberrated reference beam 13. This is not shown in the figure. Another requirement is that reflective elements known in the art to eliminate image inversion during transfer of the aberrated reference beams from the front side of the LCLVs to the error input or photoconductor side of the LCLVs should be used.

The LCLV used in the present invention is a modified version of a standard liquid crystal light valve (for example, U.S. Pat. No. 4,019,807, Hughes Model H-4060 with either a CdS or Si photoconductor). The standard liquid crystal light valve, for example, Hughes Model H-4060 uses nematic liquid crystals which are twisted. For the purposes of the present invention, this twisted nematic liquid crystal layer is replaced with a parallel-aligned liquid crystal layer, as discussed in Ser. No. 865,231, the disclosure of which is incorporated herein by reference.

While the invention has been described in the context of cascaded LCLV spatial light modulators, it will be evident that other spatial light modulators may be used in the invention to provide similar benefits. For example, a plurality of SLMs with different characteristics may be used to provide both fine resolution and rapid response in a system demanding such characteristics, even though SLMs with both such characteristics are not available, provided that the control mechanisms for the SLMs and the arrangement of the components is tailored to the characteristics of the SLMs and the desired system response.

The invention may also be used to provide an imaged output that has been corrected for phase aberrations. If the spatial light modulators, such as LCLVs, are suitable for the purpose of imaging, and the optics of the system are designed to preserve the image content of the aberrated beam, then the same feedback loop system concepts described above may be used to correct for aberrations in an image that has passed through an aberrating medium. Similarly, the invention may be used to correct for aberrations in a reflected from one LCLV to LCLV in an imaging system designed to compensate for phase aberration due to passage through a non-uniform medium.

Although certain specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. A cascaded adaptive optics system comprising:
   a first spatial light modulator (SLM) disposed to receive an aberrated reference light beam and operative to provide a first reflected beam in response thereto;
   first error means, operative to provide, at an error input of the first SLM, a first error signal indicative of any aberration in the first reflected beam, said first SLM being responsive to the first error signal to compensate for the aberration in the reference beam by inducing in the first reflected beam aberration that is a conjugate of the aberration in the reference beam;
   at least one additional SLM, disposed to receive the first reflected beam and operative to provide another reflected beam in response thereto; and
   additional error means, operative to provide, at an error input of the additional SLM, an error signal indicative of any aberration in the additional reflected beam, said additional SLM being responsive to the second error signal to compensate for the aberration in the first reflected beam by inducing in the additional reflected beam aberration that is a conjugate of the aberration in the first reflected beam.

2. An adaptive optics system according to claim 1 wherein the SLMs have complementary speed and dynamic range characteristics.

3. The adaptive optics system according to claim 1 wherein said SLMs comprise Liquid Crystal Light Valves (LCLVs).

4. An adaptive optics system according to claim 3 wherein one of the LCLVs includes a cadmium sulfide photoconductor.

5. An adaptive optics system according to claim 3 wherein a first one of the LCLVs includes a silicon photoconductor.

6. An adaptive optics system according to claim 5 wherein a second one of the LCLV includes a cadmium sulfide photoconductor.

7. An adaptive optics system according to claim 1 and further comprising a laser source for projecting a laser beam toward the second SLM along a path followed by the second reflected beam, the laser beam propagating oppositely thereto whereby the laser beam is reflected in turn by the second SLM and the first SLM, the laser beam thence propagating oppositely to the reference beam, the SLMs being operative to induce in the laser beam when thusly reflected aberrations that is a conjugate of the aberration present in the reference beam.

8. An adaptive optics system according to claim 1 wherein the first error means comprises means for generating a local reference beam and wherein the first error signal comprises an interference pattern between the local beam and the first reflected beam.

9. An adaptive optics system according to claim 8 wherein the means for generating the local beam comprises a spatial filter disposed to receive a portion of the first reflected beam and operative to derive therefrom the local beam.

10. A cascaded liquid crystal light valve (LCLV) adaptive optics system comprising:
    a first LCLV disposed to receive an aberrated reference light beam and operative to provide a first reflected beam in response thereto;
    a second LCLV disposed to receive the first reflected beam and operative to provide a second reflected beam in response thereto; and
    error means, operative to provide, at error inputs of the first and second LCLSs, an error signal indicative of any aberration in the second reflected beam, the first LCLV being responsive to the error signal to compensate for the aberration in the reference beam by inducing in the first reflected beam aberration that is a conjugate of the aberration in the reference beam, and the second LCLV being responsive to the error signal to compensate for any aberration in the first reflected beam by inducing in the second reflected beam aberration that is a conjugate of the aberration in the first reflected beam.

11. An adaptive optics system according to claim 10 wherein the two LCLVs have complementary speed and dynamic range characteristics.

12. An adaptive optics system according to claim 10 wherein one of the LCLVs comprises a cadmium sulfide photoconductor.

13. An adaptive optics system according to claim 10 wherein a first one of the LCLVs comprises a silicon photoconductor.

14. An adaptive optics system according to claim 11 wherein a second one of the LCLVs comprises a cadmium sulfide photoconductor.

15. An adaptive optics system according to claim 10 and further comprising a laser source for projecting a laser beam toward the second LCLV along a path followed by the second reflected beam, the laser beam propagating oppositely thereto whereby the laser beam is reflected in turn by the second LCLV and the first LCLV, the laser beam thence propagating oppositely to the reference beam, the valves being operative to induce in the laser beam when thus reflected aberration that is a conjugate of the aberration present in the reference beam.

16. An adaptive optics system according to claim 10 wherein the error means comprises means for generating a local reference beam and wherein the error signal comprises an interference pattern between the local beam and the second reflected beam.

17. An adaptive optics system according to claim 16 wherein the means for generating the local beam comprises a spatial filter disposed to receive a portion of the second reflected beam and operative to derive therefrom the local beam.

18. A hybrid cascaded adaptive optics system comprising:
   adaptive optical compensation means, disposed to receive a aberrated reference light beam and operative to provide a aberration-compensated first reflected beam in response thereto;
   a spatial light modulator (SLM), disposed to receive the first reflected beam and operative to provide a second reflected beam in response thereto; and
   error means, operative to provide, at an error input of the SLM, an error signal indicative of any aberration in the second reflected beam, the SLM being responsive to the error signal to compensate for the aberration in the first reflected beam by inducing in the second reflected beam aberration in that is a conjugate of the aberration in the first reflected beam.

19. An adaptive optics system according to claim 18 wherein the adaptive optical compensation means comprises:
   a deformable mirror, disposed to receive the distorted reference light beam and operative to provide the first reflected beam in response thereto;
   means for providing a mirror correction beam from the first reflected beam;
   mirror control means, disposed to receive the mirror correction beam and operative to provide a deformation signal indicative of any aberration therein; and
   mirror deforming means, responsive to the deformation signal to compensate for the aberration in the reference beam by deforming the mirror to induce in the first reflected beam aberration that is a conjugate of the aberration in the reference beam.

20. An adaptive optics system according to claim 18 wherein the SLM comprises a cadmium sulfide photoconductor.

21. An adaptive optics system according to claim 18 wherein the SLM comprises a silicon photoconductor.

22. An adaptive optics system according to claim 18 and further comprising a laser source for projecting a laser beam toward the SLM along a path described by the second reflected beam, the laser beam propagating oppositely thereto whereby the laser beam is reflected in turn by the LCLV and the adaptive optical compensation means, the laser beam thence propagating oppositely to the reference beam, the LCLV and the compensation means being operative to induce in the laser beam when thusly reflected aberration that is a conjugate of the aberration present in the reference beam.

23. An adaptive optics system according to claim 18 wherein the error means comprises means for generating a local reference beam and wherein the error signal comprises an interference pattern between the local beam and the second reflected beam.

24. An adaptive optics system according to claim 23 wherein the means for generating the local beam comprises a spatial filter disposed to receive a portion of the second reflected beam and operative to derive therefrom the local beam.

* * * * *